Figure 1:
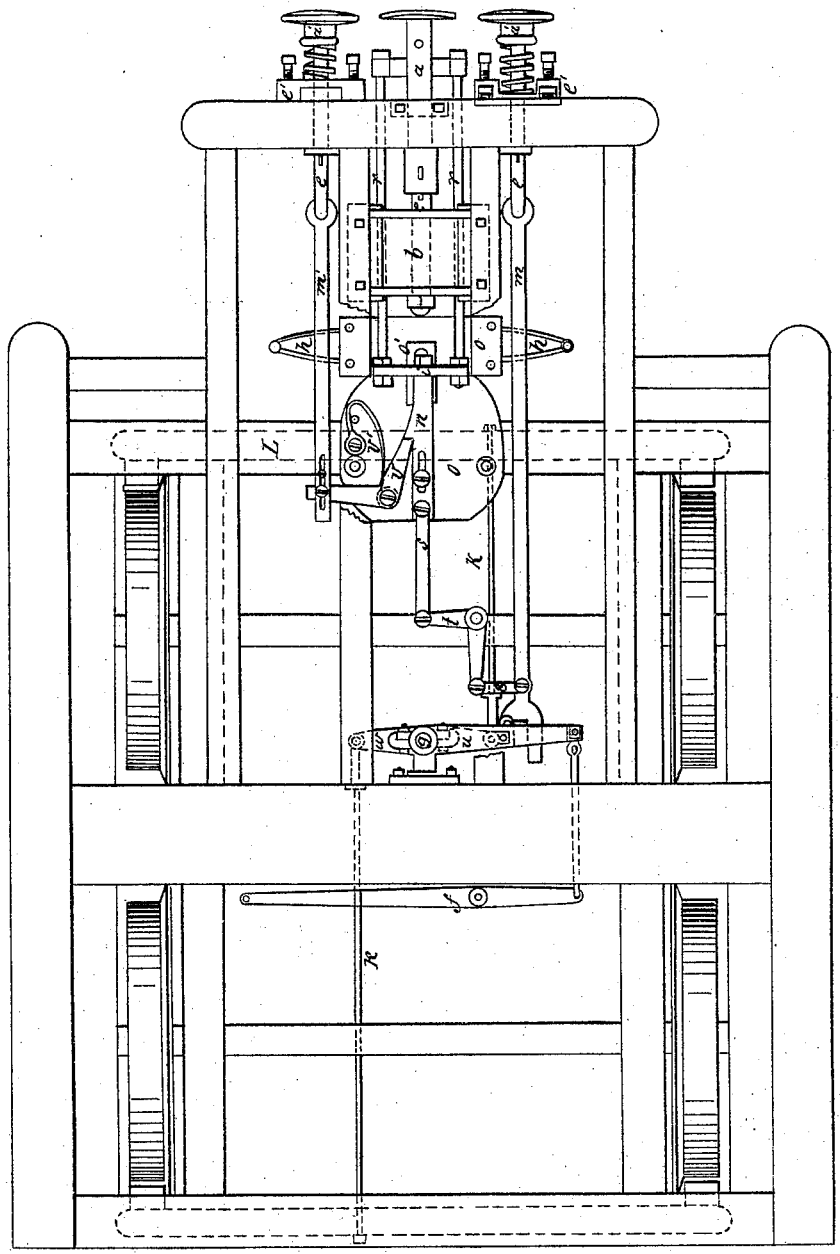

F. ARMSTRONG.
Car Brake.

No. 16,042.

2 Sheets—Sheet 1.

Patented Nov. 11, 1856.

Inventor:
Francis Armstrong

F. ARMSTRONG.
Car Brake.
No. 16,042.
2 Sheets—Sheet 2.
Patented Nov. 11, 1856.
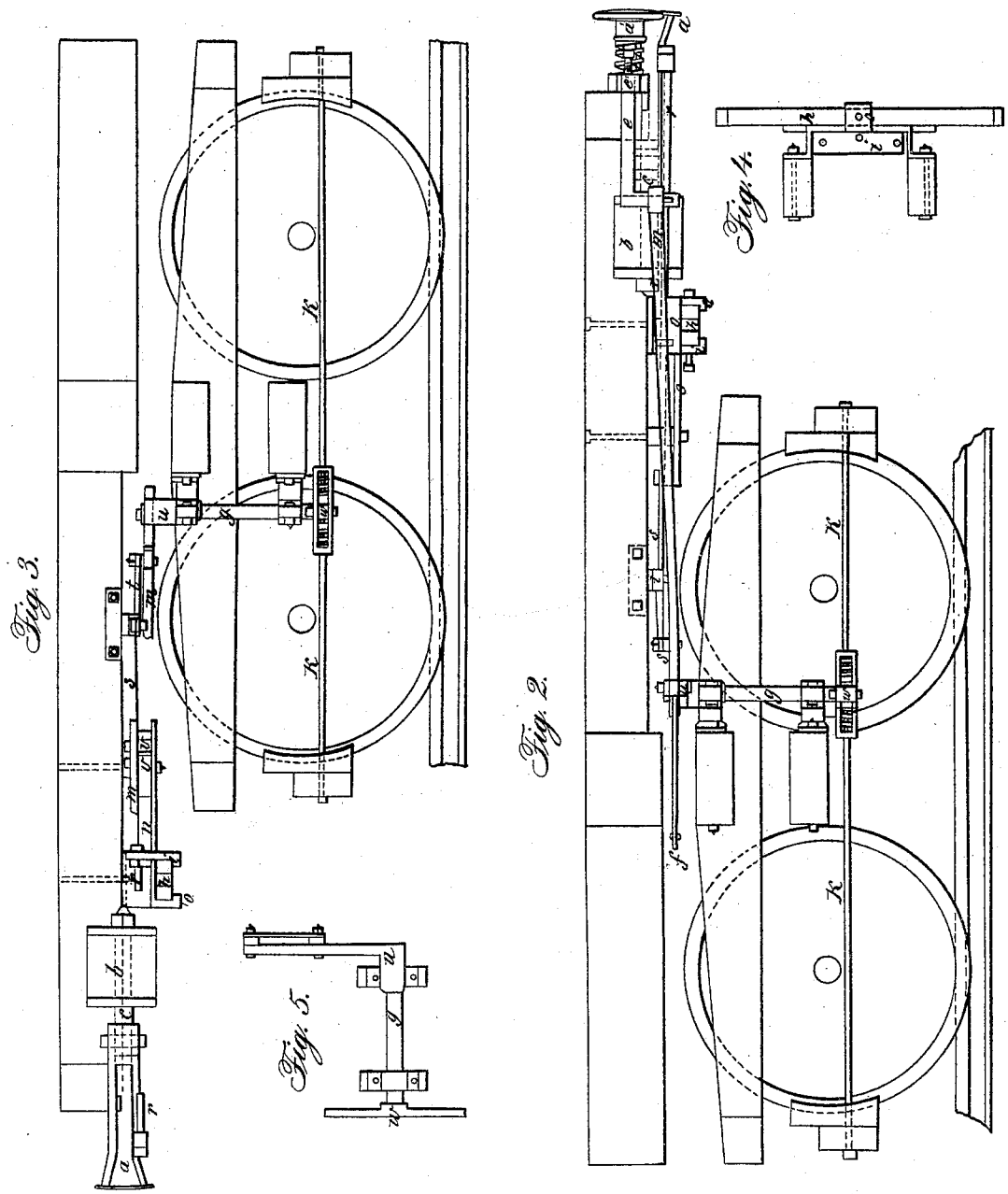
Inventor,
Francis Armstrong

UNITED STATES PATENT OFFICE.

FRANCIS ARMSTRONG, OF NEW ORLEANS, LOUISIANA.

IMPROVEMENT IN BUMPER-BRAKES FOR RAILROAD-CARS.

Specification forming part of Letters Patent No. 16,042, dated November 11, 1856.

*To all whom it may concern:*

Be it known that I, FRANCIS ARMSTRONG, of the city of New Orleans, parish of Orleans, State of Louisiana, have made a new and useful Improvement in the Construction of Self-Acting and Self-Adjusting Brakes for Railroad-Cars; and I hereby declare that the following is a full and exact description thereof, reference being had to the accompanying drawings and the letters of reference marked thereon, making a part of this specification.

The *modus operandi* of this invention: The first motion acquired from the pull on the cars in their being started by the power of the locomotive-engine I make the coupling to move longitudinally on the draft-bar a distance of two inches before the main bumper is acted on in the pulling, although it is not important to confine this movement of the coupling to this stated distance, provided the other parts of the apparatus that move in connection with it are arranged in accordance. I place in front of the car-frame, on either side of the coupling, heads mounted on the ends of bars that pass through the front cross-frame of the cars, the arrangement of which can be seen in Figures 1 and 2. These heads are actuated on by springs to secure their established distance of projection from the frame when not being forced back by any pressure acting on them. To the same bars on which these heads are mounted at the reverse ends from the head I attach a bar. Each one of these bars (marked $m$ in Figs. 1 and 2) is made to extend to an arm marked $u$. (Seen in same figures.) This arm $u$ is mounted on the vertical shaft $g$, to which is attached the double arm $w$. To this arm $w$ the rods that connect the beams on which the friction-blocks that act on the wheels as brakes are attached, and the turning of the shaft $g$ by a force acting on the arm $u$ closes the brakes on the wheels. The bar $m$ is made to pass through the arm $u$, there being a mortise made through the arm $u$ to admit the bar $m$ to pass through, as seen in Fig. 5. When the bar $m$ is in one position, the force acting on the head to which it is attached can slide it through the mortise in the arm $u$ without acting on the shaft $g$ as to turn or give it motion; but when the bar $m$ is changed in another position, then a force acting on the head to which it is attached must act on the shaft $g$, because the arm $u$ and the bar $m$ are placed in contact by a hook on the bar and a clutch on the arm, as seen by Fig. 1. Therefore any force acting on the bar $m$ must also communicate motion to the arm $u$ and shaft $g$ and close the brakes on the wheels by said motion.

To secure a movement of the bar $m$ in the change of position, as stated, to connect and disconnect a continuation of force to be given on the shaft $g$, this is effected by the sliding of the coupling on the draft-bar.

On the lower sides of the two center beams of the car-frame is placed the iron frame $o$, the form of which can be seen in Figs. 1, 2, 3, and 4. On this frame is mounted and working in guides the bar $n$, that is connected to the bar $m$ by crank-arm $t$ and links $s\ s$, as seen by Figs. 1, 2, and 3. There is also mounted on the frame $o$ the latch $v$, with its spring $v'$, made to catch the bar $n$ when drawn forward, as seen by Fig. 1. The bar $n$ is attached to the cross-bar $i$, mounted also on frame $o$, and the cross-bar $i$ connected to the coupling by the bars $r\ r$. Then the drawing out of the coupling swings the bar $m$ and latches the bar $n$, to prevent any change of position in the bar $m$, as seen by Fig. 1, that the bar $m$ is in position to act on the arm $u$ in the turning the shaft $g$. Through the frame $o$ a mortise is made, (seen by Fig. 1, marked $o'$,) the cross-bar $i$ having a branch extending through this mortise and making a clamp for a spring placed below and attached to the frame $o$. This spring $h$, with the mode of attachment, is seen by Figs. 2 and 3. When this coupling is acting in moving the cross-bar $i$, the spring $h$ is made to yield to this force. The latching of the bar $n$ secures the force of elasticity of the spring $h$ to change the position of the bar $m$ in the placing it, so that its end, including its hook, will move through the mortise in the arm $u$ without turning the shaft $g$. The bar $m'$, attached to its projecting head, identical to that of the bar $m$, (seen by Fig. 1, $m'$,) is made to throw out the latch $v$ from the catch on the bar $n$ by the force acting on the projecting head to which it is attached. To this bar there is a portable clutch to be placed in such position as will act on the latch $v$ when the pressure on the brakes has been obtained by the force communicated by the bar *m*. The latch, when thrown out of its catch on *n*, relieves the spring *h* from any permanent detention in the yielding of its elasticity, and only prevented from springing back and changing in so doing the position of the bar *m*, so that it can move through the mortise in the arm *u* by the force of pressure acting on the brakes. As this pressure ceases, the change can be established or the reverse position made.

I will now refer to the separate figures after this general description.

Fig. 1 is a ground plan of the general arrangement of constructing the car-frame truck on which the wheels are mounted, wheels, shaft of wheels, &c. *a* is the coupling to which the different cars are connected attached to and sliding in guides in the front cross-frame of the cars, similar to the usual modes used in their attachment to the frame. To the coupling are attached projections on either side, admitting the bars *r r* to pass through, and these bars *r r* working free through the openings of said projections, so the coupling can slide inward without throwing any force on the cross-bar *i* or disturb the position of the spring *h*. *b* is the main bumper, made and placed similar to the common mode, mounted on guides fastened to the car frame. *c* is the draft-bar, attaching the bumper *b* to the coupling *a* and connected to the coupling by a key, the key fitting the mortise through the coupling; but the mortise in the draft-bar is made long enough to admit the coupling to slide inward and give room for the key to play equal to the distance the coupling has to slide. *o* is the iron frame attached to the frame of the cars. The timber to which this frame is supposed to be attached in this receiver is in part removed, in order to make the arrangement more clear, showing the flanges and the places for the bolts to pass to attach the same to the car-frame. *o′* is the mortise through *o*, admitting the projecting branch of the bar *i* to extend down to catch the spring *h*. *i* is the cross-bar working on the frame *o*, and between its elevated sides made between the lower table and the flanges to fasten the frame *o* to the frame of the cars. *n* is a bar attached to cross-bar *i*, mounted on the table part of *o*, working in guides to secure a parallel motion, the projection of the bar *i* in its sliding in the mortise *o′* acting as a guide at one end. *v* is the latch mounted on *o*, actuated by spring *v′* to catch the bar *n* when drawn forward by the movement of the coupling. *r r* are bars connecting the coupling to the cross-bar *i*. *s s* are links attaching the bar *n* to the bar *m* through the use of the crank-arm *t*. *a′ a′* are projecting heads placed on either side of the coupling mounted on the bars *e e*, said bars passing through the front cross-timber of the frame of the cars, and, to secure them from being extended through the frame more than a limited distance by the action of the springs holding the heads in their projected position, keys are placed through the bars *e e* catching the beam, through which they pass on the reverse side from the springs. The springs actings on these heads *a′ a′* are shown made of spiral form. It is not important whether made of this form or of other forms. If the spiral form is used, room must be allowed for the springs to act, so that no force acting on the heads can force the springs into a closed body, thereby past their elastic compass. The heads can be constructed in the form of a cup the same as the sleeves *e′*, so a portion of the spring can be admitted and increases its elastic compass without changing the extent of projection of the heads. *e′ e′* are sleeves made in the form of a cup to allow the end of the springs to seat, with screws to admit the sleeves to be acted on to increase the force of elasticity of the springs, if required. *h h* are ends of elliptic spring attached to frame *o* and clamped by the bar *i*. *m* is the bar connected to bar *e*, the end of which is placed through the mortise in the arm *u*, having a hook of circular form catching a projection on the arm *u* of corresponding form, by which the shaft *g* is made to turn. *u* is the arm on shaft *g*. *w* is one end of double arm attached to shaft *g*, to which the rods *k k* connect to the beams having the friction-blocks on. *f* is the lever attached to arm *u*, to which the hand-brake is connected. *m′* is the bar connecting the bar *e* to the latch *v*. There is a mortise in this bar *m′* to admit it to slide on the guide attaching to the latch; also to allow an adjusting-catch to be moved and placed so the latch can be thrown from its connection with the bar *n* at the time required.

Fig. 2 is a sectional side elevation showing the position of the frame of the car's truck-wheels, &c. *a* is the coupling (only a portion of this is seen—more clearly seen in Fig. 3.) *a′* is the projecting head. *e* is the bar passing through front frame of car attached to the projecting head and bar *m*. *e′* is the sleeve to act on spring. *b* is the main bumper. *h* is the end of elliptic spring attached to a projection extending down and a part of the frame *o*. *i* is the clamp of spring and screw through same to force more power in the spring, if required. *o* is the frame on which bar *i*, bar *n*, latch *v*, spring *v′* are mounted, also showing the elevated sides and the flanges to which the same are fastened to the car-frame with the extended table from said sides. *m* is the bar connecting bar *e* to arm *u*. *g* is the shaft on which arm *u* and double arm are attached, with the mode of mounting the shaft *g* to the cross-frame of the truck. *k′ k′* are rods attaching arm *w* to the cross-beam to which the friction-blocks are attached. In these rods I have represented the placing of springs that can be made to yield when a heavy force is brought to bear on the brakes to shield the apparatus from injury under such circumstances. *s s* are links attaching bar *m* to bar *n*. *t* is the crank-arm connecting links *s s* and the mode of mounting it.

Fig. 3.—This figure is intended to make more clear parts not definitely shown in Fig. 2. The projecting head is not shown, so the form of the coupling could be more clearly given. The bars *m*, *m'*, and *r* are supposed to be cut and portions intervening omitted. *a* is the coupling with key through it and draft-bar *c*. *b* is the main bumper. *r r* are ends of bar *r*. (Shown in full in Fig. 1.) *m'* is the section of bar *m'*, as shown in Fig. 1. The bars *e e* and the attachment to bars *m'* and *m* being identical, therefore Figs. 1 and 2 explain their forms, and as this does not give the bar *e* or the connection to bar *m'* the figures referred to must be used in this particular. *i* is the bar, having bar *n* and bar *r* through or attached. This bar is seen projecting through the frame *o*, clamping spring *h*. *n* is the bar mounted on *o*. *v* is the end of the latch. $v^2$ is the portable clutch. The other figures making the continued explanation of portions shown in this figure, further reference is not deemed necessary.

Fig. 4 shows the front end view of the frame *o* as made and attached to the frame of the cars, with side view of cross-bar *i* and the holes to attach the bar *n* and the bars *r r* to it in their being passed through it. A side view of spring N is also shown.

Fig. 5 shows the front view of the shaft *g*, with arm *u* having the mortise through which the bar *m* has to move, the double arm *m*, and the pillar-blocks by which the shaft is attached to truck. In the mortise in the arm *u* room must be allowed for the projection of the hook on the bar *m*, that is continuously through it to move and not strike the end of the mortise should there be a sudden pull on the coupling that would vibrate the bar *m* a greater distance than that necessary to place it in position to catch on the arm *u*.

After this my description of this invention, what I claim as new, and desire to secure by Letters Patent, is—

The employment of the yielding force made by the pull on the cars to adjust the apparatus and place it in position, that the force acting by the cars coming in contact with each other will secure that force to act on the brakes and close them on the wheels, and the force made by the pull on the cars when allowed to react reversing the position of the apparatus in the placing it so that the pressure of the cars acting against each other can operate on the apparatus and have no action on the brakes, and this is claimed whether done by the described apparatus or any other analogous mode producing the same effect.

FRANCIS ARMSTRONG.

In presence of—
 NATHL. W. FOWLER,
 R. H. BRADFORD.